United States Patent [19]
Schwesinger et al.

[11] Patent Number: 5,719,694
[45] Date of Patent: Feb. 17, 1998

[54] DEVICE FOR THE DEFLECTION OF LIGHT BEAMS

[75] Inventors: Norbert Schwesinger; Ulf Heim; Helmut Wurmus, all of Ilmenau, Germany

[73] Assignees: LDT GmbH & Co.; Laser-Display-Technologie KG, both of Gera, Germany

[21] Appl. No.: 464,673
[22] PCT Filed: Oct. 31, 1994
[86] PCT No.: PCT/EP94/03582
  § 371 Date: Jun. 30, 1995
  § 102(e) Date: Jun. 30, 1995
[87] PCT Pub. No.: WO95/12831
  PCT Pub. Date: May 11, 1995

[30] Foreign Application Priority Data

Nov. 2, 1993 [DE] Germany ............ 43 37 411.5
Feb. 3, 1994 [DE] Germany ............ 44 03 297.8

[51] Int. Cl.⁶ .................................... G02B 26/08
[52] U.S. Cl. ............................ 359/198; 359/216
[58] Field of Search .................. 359/198, 199, 359/200, 212, 216

[56] References Cited

U.S. PATENT DOCUMENTS

| | | | |
|---|---|---|---|
| 4,726,640 | 2/1988 | Iwama et al. | 359/200 |
| 4,938,551 | 7/1990 | Matsumoto | 359/216 |
| 5,042,887 | 8/1991 | Yamada | 359/360 |
| 5,170,278 | 12/1992 | Wada et al. | 359/212 |

FOREIGN PATENT DOCUMENTS 0 459 585  12/1991  European Pat. Off. .
33 12 595   4/1992  Germany .

OTHER PUBLICATIONS

Patent Abstracts of Japan, vol. 16, No. 269 (C-952) Jun. 17, 1992 (JP.A 04 065 393 (Nippon Telegr.) Mar. 2, 1992.

*Primary Examiner*—Paul M. Dzierzynski
*Assistant Examiner*—Darren E. Schuberg
*Attorney, Agent, or Firm*—McAulay Fisher Nissen Goldberg & Kiel, LLP

[57] ABSTRACT

A device for deflecting light beams, in particular laser beams, has mirror surfaces which are arranged at a drivable rotating body. The rotating body is formed of monocrystalline material and the mirror surfaces are formed by the crystal planes and are arranged symmetrically with respect to rotation.

8 Claims, 2 Drawing Sheets

DEVICE FOR THE DEFLECTION OF LIGHT BEAMS

BACKGROUND OF THE INVENTION a) Field of the Invention

The invention is directed to a device for the deflection of light beams, preferably for deflection of laser beams, with mirror surfaces which are arranged at a drivable rotating body.

b) Description of the Related Art

For the purpose of deflecting laser beams which require a continuous beam deflection for larger angles and a high deflecting speed, it is known in the art to use polygon mirrors which are driven in rotation. It is disadvantageous that the extremely complicated manufacture of these mirrors results in extraordinarily high costs. Further, the tilting freedom of the individual mirror segments with respect to the axis of rotation can not be ensured in the known polygon mirrors.

Further, deflecting mirror arrangements for light beams in which mirror surfaces which are suspended at torsional strips can tilt about the rotational axis or in which the mirror surfaces are arranged at the end of movable tongue constructions are known from the field of microtechnology. Electrostatic, piezoelectric or electrothermal drives which are generally functionally integrated with mechanics are used for such systems.

Although beam deflections of +/−10° can be realized by means of such arrangements, the respective mirror surfaces can only be produced in the range of $50 \times 50$ µm² to $500 \times 500$ µm². In known systems, the dynamic response has proven very problematic. At high frequencies, the attainable deflecting angle decreases drastically since the forces required for accelerated movement of the mirror surfaces can no longer be applied using the selected drive principles. Moreover, there occur vibration modes which result in a warping of the mirror surfaces. In order to enable a more reliable movement of the mirror surfaces also at higher frequencies, their mass must be drastically reduced, which is only possible in existing mirror surfaces by reducing their thickness. However, this leads to increased development of vibrations on the mirror surface and accordingly to operating disturbances.

OBJECT AND SUMMARY OF THE INVENTION

The summary object of the present invention is to provide a beam deflecting system which enables a high deflecting frequency at large deflecting angles and for large mirror surfaces, ensures a tilting freedom of the individual segments with respect to the rotational axis and can be manufactured economically.

This object is met according to the invention for the deflection of light beams including the deflection of laser beams. The device comprises a drivable rotating body. Mirror surfaces are arranged at the drivable rotating body. The rotating body is formed of microcrystalline material. The mirror surfaces are formed by crystal planes of the microcrystalline material and are arranged so as to be symmetric with respect to rotation.

The arrangement according to the invention is characterized in particular by the following advantages:

realization of high deflection frequencies also for relatively large light beam diameters;

economical mass production, since the advantageous techniques of batch processing in microelectronics can be used in micromechanics;

tilting freedom of the segments relative to one another;

high reflecting capacity of the mirror surfaces due to the provided materials.

The invention is explained more fully in the following with reference to embodiment examples.

DESCRIPTION OF THE PREFERRED EMBODIMENTS

Figure 1:
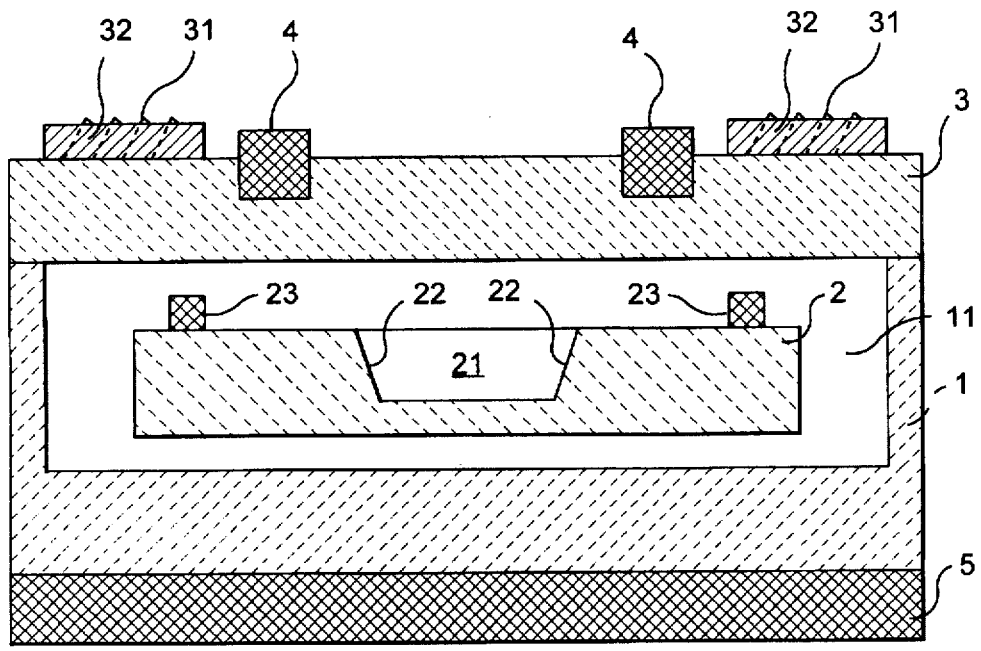
FIGS. 1 and 2 show a device according to the invention in which the mirror surfaces are located in a depression on the rotating body.
Figure 2:
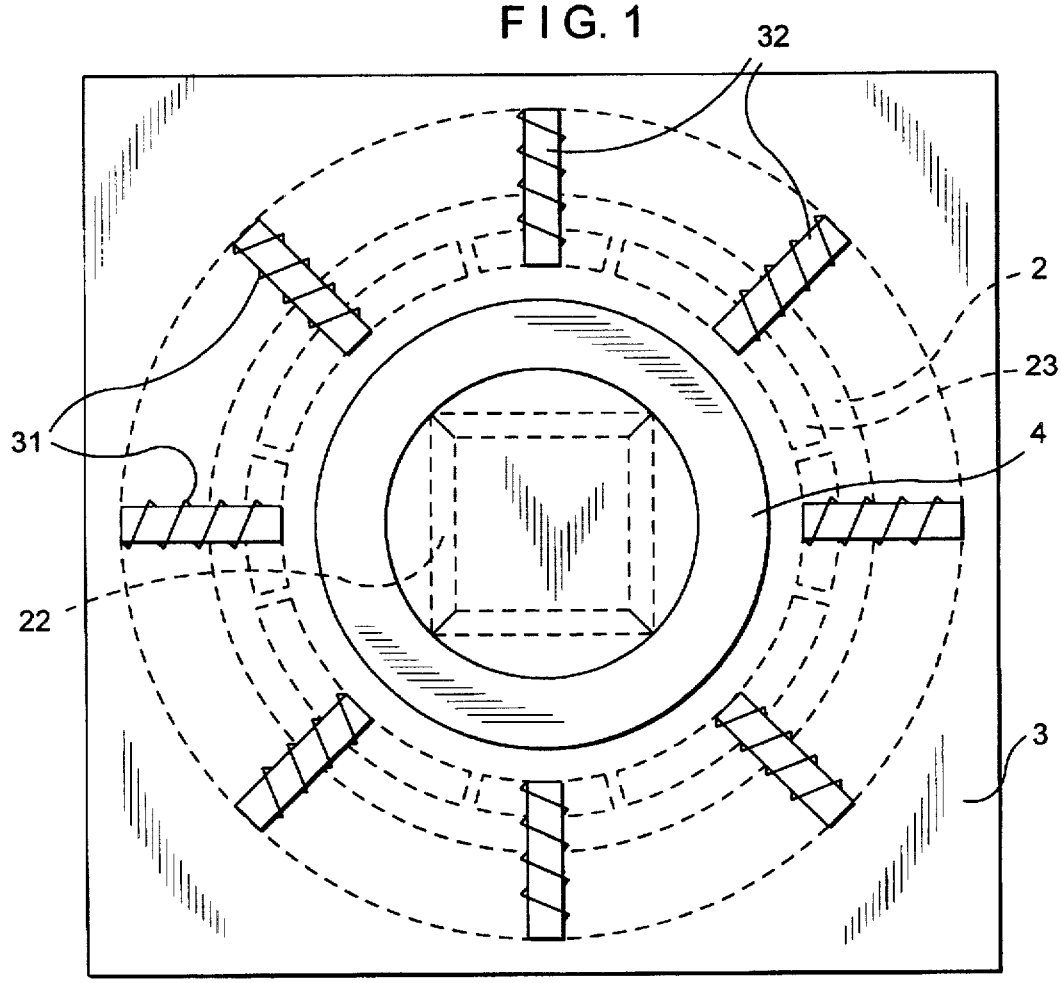

In the arrangement shown in FIGS. 1 and 2, the base body 1 contains a cut out portion 11 whose dimensions are greater than those of the disk-shaped rotating body 2. The rotating body 2 is formed of a monocrystalline material, preferably silicon, and contains a centrally arranged polygonal depression 21. The depression 21 is defined laterally by crystal planes of the rotating body 2 forming the mirror surfaces 22. An annular, segmented hard-magnetic layer 23 whose center defines the rotational axis of the rotating body 2 is located on the upper side of the rotating body 2. The base body 1, within whose cut out portion 11 the rotating body 2 is located, is hermetically sealed at the upper side by a cover plate 3 of glass. A toroidal magnet 4 and a quantity of coil pairs 31 with integrated flux guide pieces 32 are located on this cover plate. An opposite-pole magnet 5 is arranged at the underside of the base body.

Figure 3:
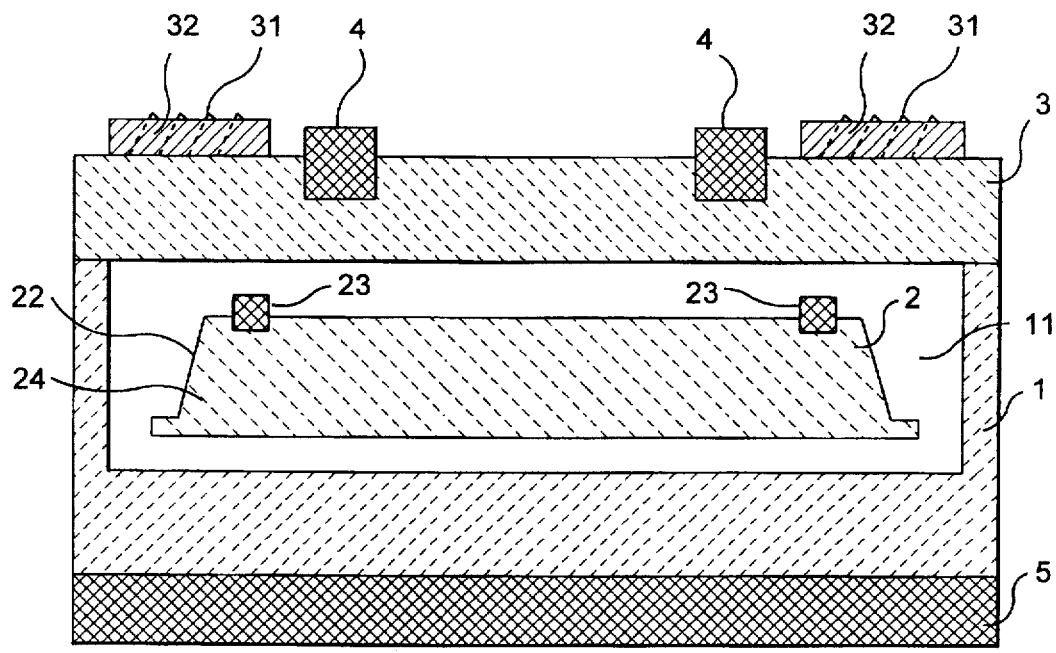
FIGS. 3 and 4 show a device according to the invention in which the mirror surfaces are located at a mesa structure arranged on the rotating body.
Figure 4:
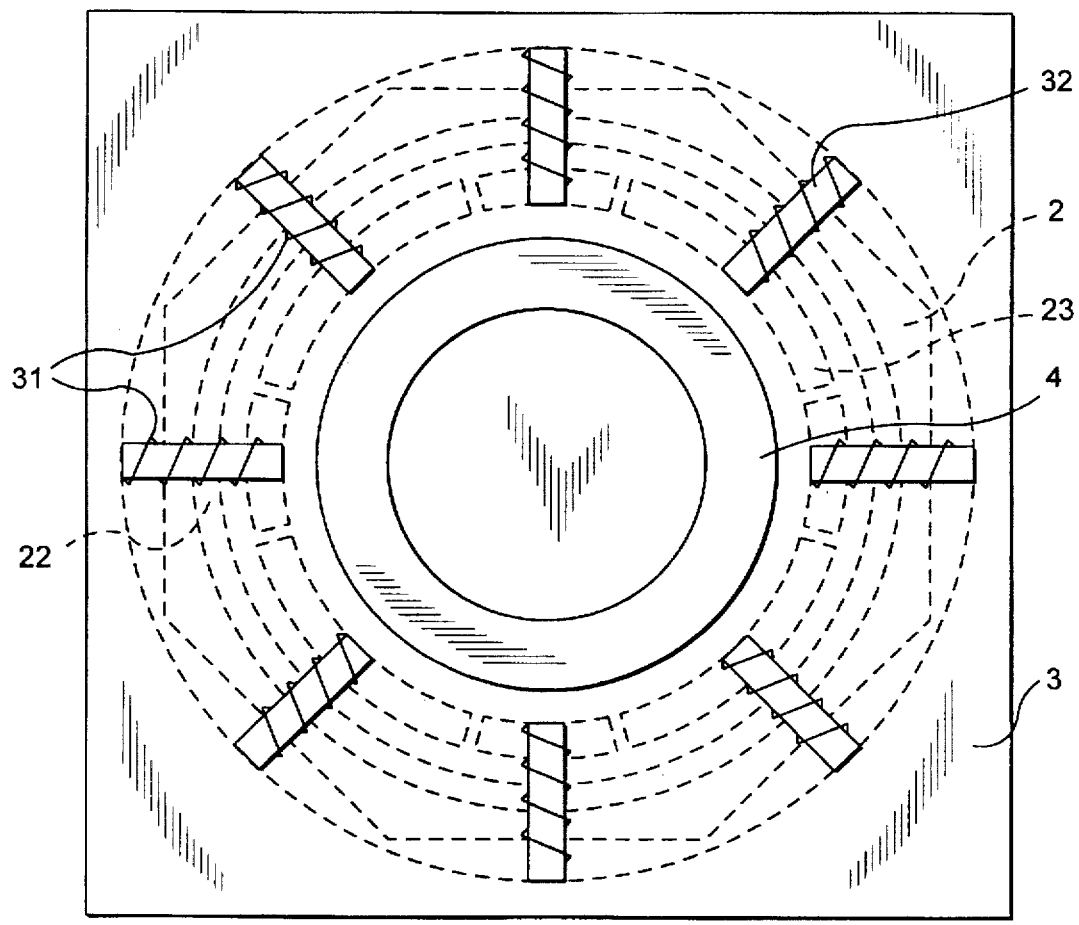

FIGS. 3 and 4 show another embodiment form of the device according to the invention in which a polyhedral mesa structure 24 is centrally arranged on the disk-shaped rotating body 2. The mesa structure 24 is defined laterally by crystal planes of the rotating body 2 which form the mirror surfaces 22. Hard magnets 23 whose center defines the rotational axis of the rotating body 2 are disposed annularly on the upper side of the rotating body 2. The base body 1, within whose cut out portion 11 the rotating body 2 is located, is again hermetically sealed at the upper side by a cover plate 3.

In both constructions, the rotating body 2 is held so as to be suspended in the cut out portion of the base body 1 by means of the segments of the hard-magnetic material on its upper side, by the force of the toroidal magnet 4 and opposite-pole magnet 5 and by the magnetic field of the coils 31. Due to the annular construction of the magnet, the rotating body 2 is centered in a compulsory manner. By suitably controlling the coil pairs 31 arranged on the base body 1, a magnetic field is generated along the flux conducting layers 32, this magnetic field in cooperation with the hard-magnetic segments on the rotating body 2 causing a turning moment. Accordingly, with a multi-polar arrangement, the rotating body 2 can be set in rotation without wobbling.

A light beam striking a mirror surface 22 of the rotating body 2 can be deflected by an angle of up to roughly 60° by the rotating movement of the mirror surface about the axis of rotation. The device according to the invention enables very high rotating speeds because, as a result of the self-centering magnet bearing, effects of friction are almost totally eliminated and unbalance can be minimized.

While the foregoing description and drawings represent the preferred embodiments of the present invention, it will be obvious to those skilled in the art that various changes and modifications may be made therein without departing from the true spirit and scope of the present invention.

What is claimed is:

1. A device for deflecting optical beams including laser beams, comprising:

a base body having a recess;

a disk-shaped rotating body disposed in said recess, said rotating body having mirror surfaces disposed in a rotationally symmetric arrangement;

a cover plate attached to said base body to close said recess;

a plurality of hard-magnetic segments located in an annular arrangement on an upper surface of said rotating body, said annular arrangement having a center coinciding with an axis of rotation of said rotating body;

at least one ring magnet located on said cover plate;

an opposite-pole magnet arranged on said base body below said rotating body; and a plurality of electromagnet coils arranged on said cover plate for generating a magnetic field to exert a torque on said rotating body in cooperation with a magnetic field of said hard-magnetic segments and to hold said rotating body in a freely floating manner in said recess in cooperation with a field of said ring magnet and a field of said opposite-pole magnet.

2. The device defined in claim 1 wherein said rotating body is made of monocrystalline material.

3. The device defined in claim 2 wherein said rotating body has a central depression in which said mirror surfaces are located.

4. The device defined in claim 3 wherein said monocrystalline material has defined crystal planes with an angle of inclination, said depression having a polygonal cross-section, said mirror surfaces extending at said angle of inclination.

5. The device defined in claim 2 wherein said rotating body includes a polyhedral mesa structure, said mirror surfaces being side surfaces of said mesa structure.

6. The device defined in claim 1 wherein said rotating body has a central depression in which said mirror surfaces are located.

7. The device defined in claim 1 wherein said coils are provided with integrated flux conductors.

8. The device defined in claim 1 wherein said cover plate closes said recess in a hermetic seal.

* * * * *